ICE CRACKER GRID
Filed March 28, 1966
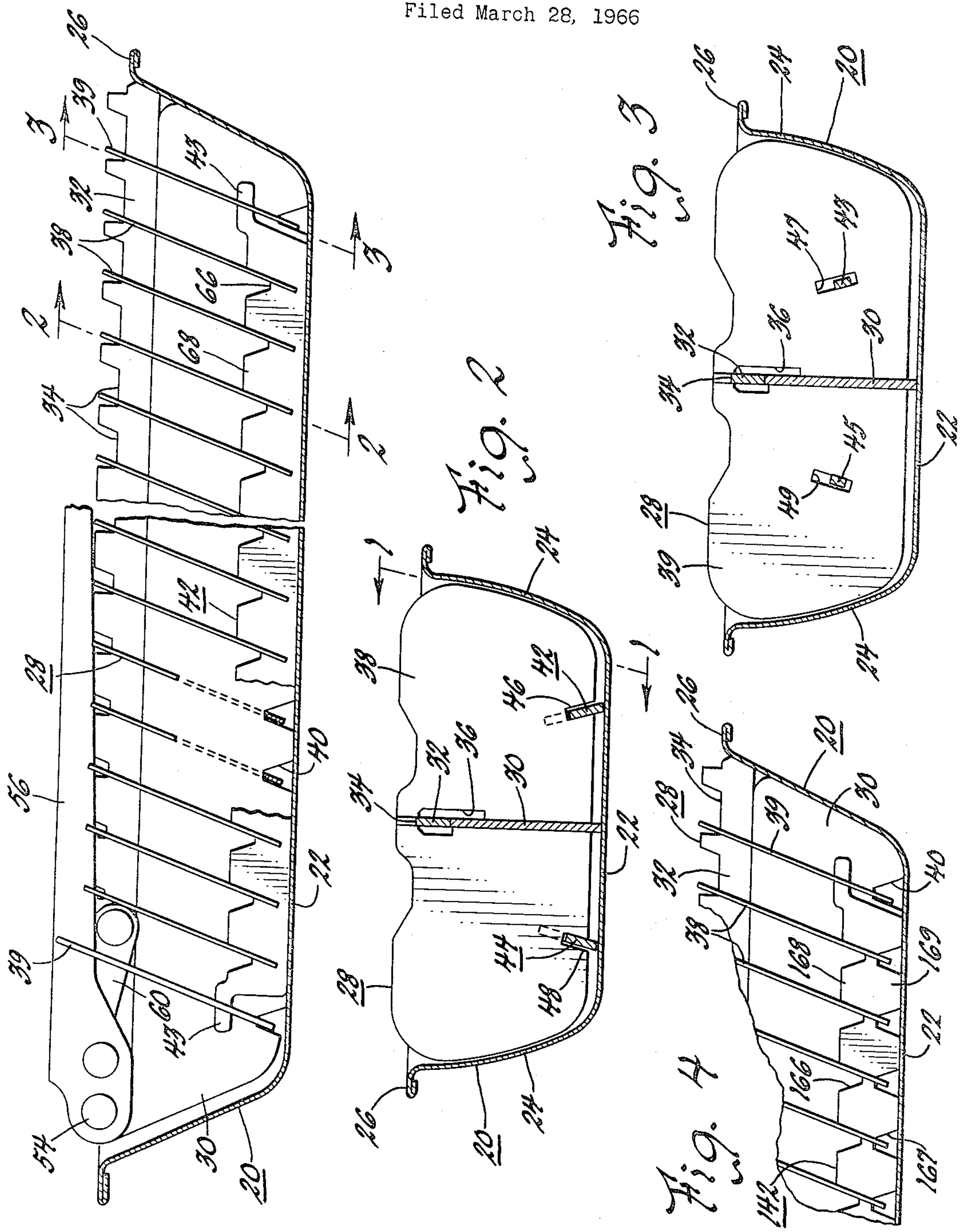
INVENTORS
Robert M. Strahan
Joe P. Pietrzak
BY
Carl A. Stickel
THEIR ATTORNEY United States Patent Office 3,335,578

Patented Aug. 15, 1967

1

3,335,578

ICE CRACKER GRID

Robert M. Strahan, Vandalia, and Joe P. Pietrzak, Dayton, Ohio, assignors to General Motors Corporation, Detroit, Mich., a corporation of Delaware Filed Mar. 28, 1966, Ser. No. 538,013

7 Claims. (Cl. 62—320)

ABSTRACT OF THE DISCLOSURE

In the preferred form, breaker bars, rectangular in cross section, extend beneath the transverse walls of the grid within angularly positioned notches in the bottom edge of all of the transverse walls excepting the front and rear transverse walls. The front and rear transverse walls have closed apertures which receive and loosely support the ends of the breaker bars.

This invention pertains to a freezing tray which will provide cracked frozen liquid especially cracked ice.

Many people do not have ice cube crushers to prepare ice for drinks. Some attempts have been made to provide freezing trays with movable grids which will provide cracked ice. However, it was found that these grids were difficult to operate and the pieces of frozen liquid or ice were irregular in size and tended to adhere to the grid after cracking.

It is an object of this invention to provide a freezing tray with a removable ejector grid having loosely connected thereto a set of breaker bars which normally rest upon the bottom of the tray to cooperate with the ejecting movement of the grid to crack into small loose pieces the frozen liquid.

This and other objects are attained in the form shown in the drawings in which the ejector grid has an upper longitudinally movable bar on top of the lower longitudinal partition wall. This upper bar is provided with upwardly facing notches of progressively increasing width from the front to the rear thereof. These notches support the upper ends of a series of substantially identical closely spaced transverse walls which are supported with their lower edges above the bottom of the container pan. According to this invention, all except the end transverse walls have open ended slots diverging inwardly from their lower edges toward the longitudinal partition wall. Breaker bars, rectangular in cross section and notched along their upper edges, or both their upper and lower edges, fit in these notches and normally rest on the bottom of the container pan. The partition walls engage the notches in the breaker bars and the teeth from between the notches imbed in the frozen liquid. When the upper bar is moved forward to progressively move the upper portion of the transverse walls, the frozen liquid is broken free from the grid into small pieces which readily fall from the grid upon removal of the grid from the container pan. The breaker bars have upwardly extending offset end portions of smaller size which fit loosely into the transverse end walls to allow them to fall below the lower edges of the transverse walls and the bottom of the longitudinal walls so that they will rest upon and be supported by the bottom of the container pan.

Further objects and advantages of the present invention will be apparent from the following description, reference being had to the accompanying drawings wherein preferred embodiments of the present invention are clearly shown.

In the drawings:

FIGURE 1 is a side sectional view taken along the lines 1—1 of FIGURE 2 of a freezing tray with an ice cracking grid embodying one form of my invention;

2

FIGURE 2 is a transverse sectional view taken along the line 2—2 of FIGURE 1;

FIGURE 3 is a transverse sectional view through the grid and tray taken along the lines 3—3 of FIGURE 1; and, FIGURE 4 is a fragmentary sectional view similar to FIGURE 1 but showing a breaker bar having notches in both its upper and lower surfaces.

Referring now to the drawing, there is shown a freezing tray 20 having a bottom 22 with flaring sides 24 extending outwardly and upwardly at an angle of about 70° from the horizontal. The pan or tray also has an upper rim 26 and preferably has its interior coated with polytetrafluorethylene. In addition to this, the pan 20 is anodized and coated with the coating material disclosed in Patent 3,016,719 issued Jan. 16, 1962. Within the pan 20 is a removable ejector grid 28 including a lower longitudinal partition wall 30 resting upon the bottom 22 of the tray 20. The upper portion of the longitudinal partition wall is provided by a rectangular bar 32 which rides upon the top of the lower portion 30 and is longitudinally movable relative thereto. This bar 32 is provided with a plurality of closely spaced upwardly facing notches 34 in its upper surface which have a progressively increasing width from front to rear. The upper and lower longitudinal wall portions 30 and 32 extend through an irregular central vertical slot 36 in each of the transverse partition walls 38. The webs at the upper ends of the slots 36 of the walls 38 each rest in a separate notch 34 in the bar 32 which is sufficiently elevated by the wall 30 to raise the bottom edges of the transverse walls a sufficient distance above the bottom of the tray 22 so that they will not scrape during movement thereof. The bottom of the lower longitudinal wall portion is provided with a series of equally spaced notches 40, each of which receives a web of one of the partition walls 38 at the lower end of the upright slot 36. The forward movement of the upper bar 32 relative to the wall 30 provides a progressive movement of the upper portions of the transverse walls 38 as illustrated in Patent 2,351,303 issued June 13, 1944.

To break and crack the frozen liquid or ice in the pan upon ejecting movement of the longitudinal bar 32 and the progressive forward movement of the upper portion of the transverse walls 38, we add to the grid two longitudinally extending breaker bars 42 and 44 which tilt inwardly at about 15° from the vertical. These breaker bars 42 and 44 extend through open ended notches 46 and 48 in the bottom edges of all the transverse walls 38 excepting the two end walls 39 as shown in FIGURE 3. The end walls 39 have closed slots 47 and 49 therein which receive and form a lost motion connection with the adjacent upwardly offset end projections 43 and 45 at each end of the breaker bars 42 and 44. The projecting ends 43 and 45 fit sufficiently loosely in the slots 47 and 49 so that when the grid 28 is in the pan, the bottom of the bars 42 and 44 will rest upon the bottom of the pan. When the grid 28 is removed from the pan, the bars 42 and 44 will hang downwardly supported loosely by their projection ends 43 and 45 extending into the slots 47 and 49. This will allow the bars 42 and 44 to hang with their lower edges below the level of the lower edge of the longitudinal wall portion 30 when removed from the tray. This assures their resting upon the bottom 22 of the pan 20 whenever the grid 28 is in the pan. All parts of the ejector grid are coated with the coating material disclosed in Patent 3,016,719 issued Jan. 16, 1962.

After the liquid or ice is frozen in the pan 20, the longitudinally movable rectangular bar 32 is pulled forward by the link 60 connecting with the handle 56 which is pivoted upon the rivet or pivot pin 54 to the front end of the lower longitudinal wall portion 30. This forward movement of the bar 32 causes the rear edges of the notches 34 to progressively engage the transverse walls 39 and 38 beginning at the front to crack the ice within the pan 20. This cracking of the ice is facilitated by the teeth 68 upon the bars 42 and 44 between the notches 66 thereof which also receive the adjacent portions of the transverse walls 38 above the open ended notches or slots 46 and 48. The breaker bars 42 and 44 are moved a slight amount longitudinally, upwardly and laterally within the notches 46 and 48 during the operation of the handle 44 to impose lateral shear stresses upon the ice to assist in the substantially uniform cracking of the frozen liquid or ice therein.

In FIGURE 4 a modified form of breaker bar 142 is shown having both an upper series 166 of regular upwardly facing notches as well as a series of downwardly facing regular notches 167 in its lower surface. The engagement of the bars 142 with the lower web portions of the transverse partition walls 38 and 39 during the ejecting operation causes a slight lateral and longitudinal movement of the breaker bars 142 which are otherwise similar to the breaker bars 42 and 44 which are illustrated in FIGURES 1 and 3. The notches 166, 167 on the upper and lower surfaces provide a series of teeth 168 and 169 which imbed themselves in the ice to assist in the uniform cracking thereof upon ejection. The remainder of the grid is similar to that in FIGURES 1–3.

While the embodiments of the present invention as herein disclosed constitute preferred forms, it is to be understood that other forms might be adopted.

What is claimed is as follows:

1. A grid for dividing the interior of a freezing pan comprising a longitudinal wall and spaced movable transverse walls, and bars on opposite sides of said longitudinal wall extending longitudinally beneath said transverse walls, said bars being provided with a lost motion connection with some of said transverse walls for support beneath said transverse walls.

2. A grid as defined in claim 1 in which the bottoms of a majority of said transverse walls having open ended slots receiving and laterally supporting said bars.

3. A grid as defined in claim 1 in which the end transverse walls only have openings and the opposite ends of said bars having projections smaller in cross section than said openings extending through said openings, said end walls having supporting surfaces at the bottoms of said openings for supporting said projections.

4. A grid as defined in claim 1 in which the bottoms of the transverse partition walls between the two partition walls at the opposite ends of the grid are provided with open ended slots receiving and laterally supporting said bars, the transverse partition walls at the opposite ends of said grid being provided with openings, said bars having projections smaller in cross section than said openings extending through said openings, said end walls having supporting surfaces at the bottoms of said openings for providing a loose upward support to prevent said bars from falling out of said slots.

5. A grid as defined in claim 1 in which said bars are provided with a series of spaced notches upon both their upper and lower surfaces.

6. A grid as defined in claim 1 in which said bars are rectangular and are provided with a series of upwardly facing teeth projecting upwardly between said transverse walls.

7. A grid as defined in claim 1 in which said bars are rectangular and have flat sides positioned at an angle to the vertical and which are provided with a series of upwardly facing teeth projecting upwardly between said transverse walls.

References Cited

UNITED STATES PATENTS

| | | | |
|---|---|---|---|
| 2,642,726 | 6/1953 | Frei | 249—72 |
| 2,690,651 | 10/1954 | Grinnel | 62—320 |
| 2,783,619 | 3/1957 | Yates | 62—320 |
| 2,862,370 | 12/1958 | Frei | 249—72 |

ROBERT A. O'LEARY, *Primary Examiner.*

W. E. WAYNER, *Assistant Examiner.*